United States Patent
Cox et al.

(10) Patent No.: US 10,120,829 B2
(45) Date of Patent: Nov. 6, 2018

(54) BUS DEVICE WITH PROGRAMMABLE ADDRESS

(71) Applicant: Infineon Technologies Austria AG, Villach (AT)

(72) Inventors: David Grant Cox, Rosegg (AT); Nathalie Abry, Villach (AT); Erwin Huber, Munich (DE); Karl Norling, Villach (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 170 days.

(21) Appl. No.: 15/360,580

(22) Filed: Nov. 23, 2016

(65) Prior Publication Data

US 2018/0143935 A1 May 24, 2018

(51) Int. Cl.
*G06F 13/362* (2006.01)
*G06F 13/42* (2006.01)

(52) U.S. Cl.
CPC ........ *G06F 13/4221* (2013.01); *G06F 13/362* (2013.01)

(58) Field of Classification Search
None
See application file for complete search history.

(56) References Cited

U.S. PATENT DOCUMENTS

| | | | | |
|---|---|---|---|---|
| 5,884,027 | A * | 3/1999 | Garbus | G06F 13/4027 370/402 |
| 5,913,045 | A * | 6/1999 | Gillespie | G06F 13/24 710/266 |
| 6,098,110 | A * | 8/2000 | Witkowski | H04L 49/351 370/412 |
| 6,101,322 | A * | 8/2000 | Goodrum | G06F 13/4081 710/302 |
| 6,108,741 | A * | 8/2000 | MacLaren | G06F 13/4036 710/108 |
| 9,432,298 | B1 * | 8/2016 | Smith | H04L 49/9057 |
| 2003/0200339 | A1 * | 10/2003 | Greenblat | G06F 15/78 709/250 |
| 2008/0005417 | A1 * | 1/2008 | Lee | G06F 13/1684 710/62 |
| 2009/0113115 | A1 * | 4/2009 | Nazarian | G11C 11/5621 711/103 |

* cited by examiner

*Primary Examiner* — Michael Sun
(74) *Attorney, Agent, or Firm* — Slater Matsil, LLP

(57) ABSTRACT

An embodiment bus device with a programmable address includes a bus communication circuit connected to a bus terminal, a first pin terminal, a memory having a first register with a first address stored therein and a second register, and a state logic circuit. The state logic circuit detects a chip select signal on the first pin terminal, receives a first message through the bus communication circuit while the chip select signal is asserted, determines that the first message indicates an address set command, and saves an address value in the first message as a second address in the second register in response to a target address in the first message matching the first address. The state logic circuit further processes a second message received through the bus communication circuit in response to a target address of the second message matching the second address.

24 Claims, 7 Drawing Sheets

BUS DEVICE WITH PROGRAMMABLE ADDRESS

TECHNICAL FIELD

The present invention relates generally to a system and method for setting an address of a bus device, and, in particular embodiments, to a system and method for setting an address of a bus device using a bus message.

BACKGROUND

In many electronic systems, a bus is provided, and multiple components are connected to the bus. The bus provides a pathway on which components may communicate with each other. In a master-slave bus arrangement, such as on an Inter-Integrated Circuit (I2C) bus, Serial Peripheral Interface (SPI) bus, System Management Bus (SMBus or SMB), direct memory access (DMA), Power Management Bus (PMBus), or the like, one or more master devices communicate with one or more slave devices. A master device communicating with a slave device initiates communications by addressing the slave device, either through an address in a message over the bus, or through dedicated messaging pins outside of the bus. When a slave device is addressed over the bus, for example, in an I2C bus, the master device may signal control of the bus through power levels on the bus lines, and then may send packets with an address of a target slave device, a command, and data. Addresses used to communicate with the slave device over the bus may be assigned by a system bus management entity, and the addresses are generally assigned to a particular type of device or class of devices. Thus, multiple devices of the same model, type, or manufacturer may be assigned the same address.

SUMMARY

An embodiment device includes a bus communication circuit connected to a bus terminal, a first pin terminal, a memory having a first register with a first address stored therein and a second register, and a state logic circuit connected to the memory, the first pin terminal and the bus communication circuit. The state logic circuit has circuitry that detects a chip select signal on the first pin terminal and that receives a first message through the bus communication circuit while the chip select signal is asserted. The state logic circuit further has circuitry that determines that the first message indicates an address set command and saves an address value in the first message as a second address in the second register in response to a target address in the first message matching the first address. The state logic circuit further has circuitry that processes a second message received through the bus communication circuit in response to a target address of the second message matching the second address.

An embodiment method includes asserting, to a chip select pin of a first slave device connected to a bus, a chip select signal, wherein the chip select signal is sent to the chip select pin outside of the bus and setting a first address of the first slave device by sending a first message on the bus to the first slave device while the chip select signal is asserted. The first message includes a default address of the first slave device, a command to set the first address, and a data value representing the first address. The embodiment method further includes sending a second message to the first slave device over the bus after the chip select signal is deasserted, the second message being addressed using the first address.

An embodiment method includes detecting, by a device having a bus terminal and a first pin terminal separate from the bus terminal, that a chip select signal is asserted at the first pin terminal, receiving, by the device, on the bus terminal and while the chip select signal is asserted, a first message, the first message including a target address, a command to set a first address on the device, and a data value representing the first address, and saving the data value as the first address in a first register of the device in response to the target address of the first message matching a default address of the device. The method further includes processing, by the device, a second message received by the device on the bus terminal during normal operation in response to a target address of the second message matching the first address.

An embodiment method includes receiving a first message sent over a bus by a device connected to the bus and having saved thereon a first programmable address that is different from a default address of the device, comparing a first target address in the first message to the default address in response to a configuration check value not being set, and processing the first message in response to the first target address matching the default address and the configuration check value not being set. The method further includes comparing the first target address to the first programmable address in response to the configuration check value being set, and processing the first message in response to the first target address matching the programmable first address and the configuration check value being set.

An embodiment system includes a bus, a plurality of slave devices connected to the bus, each of the plurality of slave devices having a default address and an input pin separate from the bus. Each of the plurality of slave devices is configured to receive messages over the bus. The embodiment system further includes a control circuit connected to the bus, and separately connected by a line of a plurality of lines separate from the bus to the input pin of each of the plurality of slave devices, and the control circuit is configured to assert a signal on the line to a target slave device of the plurality of slave devices, and, while the signal is asserted, send, over the bus, a first message indicating an address set command using the default address of the target slave device. Each of the plurality of slave devices are further configured to save, when the signal is asserted to the respective slave device, a value from the first message as a first address in response to a target address of the first message matching the default address of the respective one of the plurality of slave devices.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
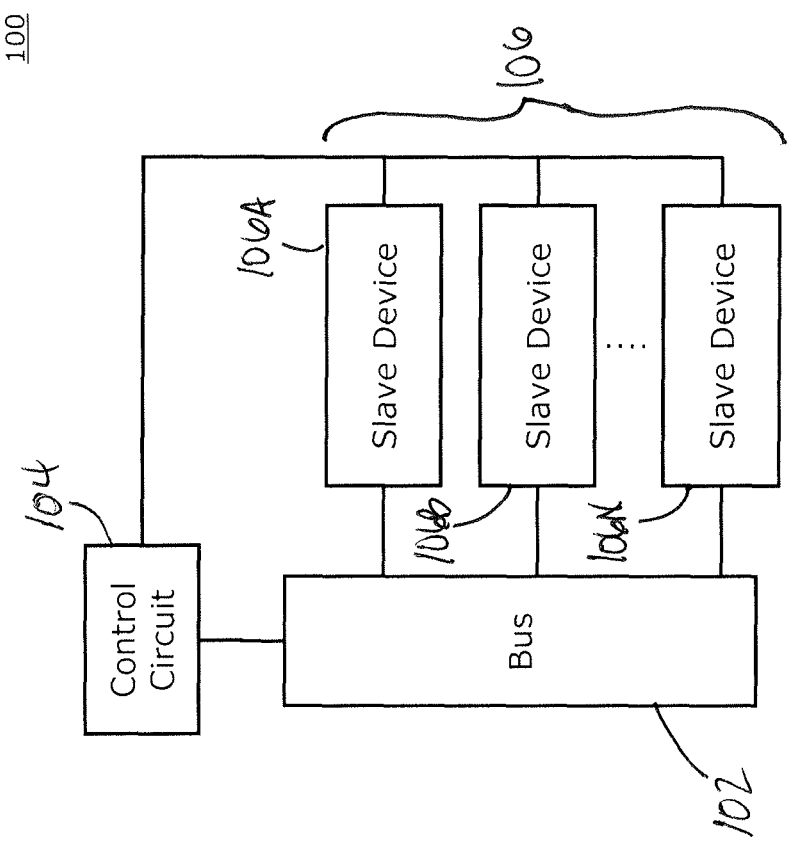
FIG. 1 is a diagram illustrating a system having slave devices with programmable addresses according to some embodiments.

Increasingly, as electronic devices are built with advanced features and more powerful capabilities, the use of duplicate components, such as bus slave devices, within a single system has increased. However, when multiple instances of a particular type of slave device are provided on a bus, a master device must address each slave device individually. With more than one identical slave device on the bus, the addresses have to be defined differently for each slave device. Default addresses used in addressing the slave device over the bus may be assigned by a standards organization or system bus management entity, and the addresses are generally assigned to a particular type of slave device or class of slave devices. Thus, multiple slave devices of the same model, type, or manufacturer may be assigned the same address. When multiple slave devices that have a same model or part number, or that are from a particular manufacturer, are provided in a system, the slave devices may have the same default address.

Embodiments regarding the disclosed slave device with a programmable address provide for a system where all connected slave devices may have a different active address to avoid being addressed simultaneously. This avoids the need to supply slave devices with different hard-programmed addresses to allow multiple slave devices of the same type on a bus. Providing for a programmable address avoids the logistical expense in increased chip area associated with hard-programmed addresses. Additionally, the programmable address avoids the need for the registers of bus interfaces to be registered with standards organizations or management entities. Thus, a customer or end user can allocate their own addresses separate from standards organizations or management entities. Embodiments of the disclosed slave device with a programmable address further provide the ability to set the address of individual slave devices through the bus. In some embodiments, the default address is only listened to if the slave device address is not configured and the chip select is set. Once an active address is configured, the chip select pins no longer act as chip select pins, and can be used for additional functions. This avoids the need for additional external dedicated address pins to configure the chip to a different address, which may not be practical or economical for pin limited packages.

Embodiments disclosed herein provide for programmable addresses in the slave devices, so that each slave device may be individually addressed without conflict. Thus, slave devices that may have a same default address at manufacture may have an active address set so that, when the slave device is included in a larger system, the slave device will not attempt to process instructions intended for other slave devices. In some embodiments, all duplicate slave devices may start up with a default identical address. However for a specific slave device to answer to that initial address, a side band chip select may be enabled. In some embodiments, this side band signal is a normal functional pin, or pins. However, at startup the normal functional pin has no effect apart from as a chip select. Side band refers to the fact that this chip select signal is not normally part of the bus interface specification. Once the slave device that has its chip select pins enabled is being addressed over the bus, the slave device can be programmed to have a different address. After the slave device has a new unique or active address programmed, the slave device it will only answer to this address and the chip select pin is no longer necessary. When the active address has been set, the pin or pins used as the chip select can be used for their original or additional functional purpose. This process may be performed for each identical slave device on the bus, so that all slave devices have different addresses. Thus, identical slave devices may be provided for subsequent programming of the usable address from a default address to a unique active address for each slave device, avoiding logistical issues that come with hard-programmed addresses. Additionally, programming the address of each slave device over the bus, and using a normally functional pin as a chip select avoids a need for extra external addressing or chip select pins. Thus, users, systems builders, or system integrators can define addresses as needed for slave devices that have with a small area and reduced pin count solution without registration of the addresses.

FIG. 1 is a diagram illustrating a system 100 having slave devices 106 with programmable addresses according to some embodiments. In an embodiment, a system 100 has a control circuit 104 connected to a bus 102. In some embodiments, the bus 102 is an Inter-Integrated Circuit (I2C) bus, Serial Peripheral Interface (SPI) bus, System Management Bus (SMBus or SMB), direct memory access (DMA), Power Management Bus (PMBus), or the like. For example, where the bus is an I2C bus, the bus 102 may have four conductive lines, including a ground line or common ground, a Vcc line that is a supply voltage line with a voltage that is about 1.2 volts to about 5.5 volts above ground, a serial data (SDA) line and a serial clock (SCL) line. The control circuit 104 may be a master device such as a processor, microcontroller, logic circuit, state machine, or the like. One or more slave devices 106, including, for example, a first slave device 106A, a second slave device 106B, or any number of other slave devices 106N, may be connected to the bus 102. The slave devices 106 may be, for example, a gate driver, light emitting diode (LED) drivers, voltage drivers, processors, memory devices, communications devices, sensors, digital-to-analog converters (DACs), analog-to-digital converters (ADCs), communications drivers, or the like. For example, where the slave device is a gate driver, the gate driver may be connected to the bus and used to control the gate of a transistor or circuit. The bus may be used to issue commands to the gate driver slave device to reset the device, perform an emergency shutdown, turn-off or turn-on of the gate driver, to perform configuration or diagnostics on the gate driver, or the like.

The control circuit 104 may communicate with the slave device 106 using a protocol that complies with the requirements of the particular protocol of the bus 102. For example, for an I2C bus, the control circuit 104 may use the I2C protocol, and may issue one or more address frames carrying an address of a target slave device 106, and one or more command and data frames that are read by the slave device at the address in the address frames. In some embodiments, the slave devices 106 may be programmable so that the active addresses identifying individual slave devices 106 may be set through the bus.

The control circuit 104 initiates programming of the address of each slave device 106 by asserting, or sending a signal on, one or more chip select pins. In some embodiments, the chip select pins of the slave device 106 are pins that have other functions during normal operation of the slave device 106. The control circuit 104 asserts the chip select pins for a single slave device 106 to notify a particular slave device that address programming is incoming, and to uniquely identify a single slave device 106 that may share a default address with one or more other slave devices 106. The chip select pins are apart or separate from the bus 102, allowing the chip select pins to be asserted while messages are sent to a slave device 106. While the chip select pins are asserted for a target slave device 106, the control circuit 104 sends a message to the target slave device to set or program the active address in the slave device 106. In some embodiments, the message may include the default address of the target slave device 106, a command to set the active address, and/or a data value for the active address. After setting the active address for a particular slave device 106, the chip select pins may be deasserted or released, and the process repeated for one or more other slave devices 106. Additionally, each slave device 106 may also have one or more programmable group addresses. The group address is separate from, and in addition to the active address or default address. The slave device 106 responds to messages received with the group address. The group address permits setting of an address that is shared by multiple slave devices so that the control circuit can control multiple slave devices with a single command or message. For example, in a system where multiple voltage drivers are provided on the bus, each individual slave device may have a different active address, but the same group address. Thus, each individual voltage driver slave device may be commanded to have a unique voltage output using the slave device's active address, but the group of voltage driver slave devices may be turned off as a group using a group turn-off command with the group address. Each voltage driver slave device receives the group turn off message, determines that the address in the message matches the group address in the slave device, and then processes the group turn-off message. In this example, the active addresses of each voltage driver slave device are different from each other, and are all different from the group address.

The addresses of the individual slave devices 106 may be set one time, or multiple times. Therefore, in some embodiments, the addresses of the slave devices 106 may be set during production, for example, to customize slave devices for use in production electronic circuits. In other embodiments, the addresses of the slave devices may be set when the slave devices 106 are used to manufacture a larger system, during a first use of the system, or during an initialization or programming stage of system production. In other embodiments, the addresses of the slave devices 106 may be set on-the-fly, or during use. For example, a master device or control circuit 104 of a system may set the addresses of each of the slave devices 106 the first time the system is booted, in response to a programming signal, or the master may set or initialize the addresses of each of the slave devices 106 each time the system is started. Each slave device 106 may store the programmed address as an active address in volatile or non-volatile memory that can be accessed by logic in the respective slave device that handles communications or logic.

Providing unique addresses to each of the slave devices 106 permits, for example, a first slave device 106A to be assigned an address that is distinct from an address assigned to a second slave device 106B or other slave devices 106N. The slave device 106 determines whether an active, or programmed, address has been set, and uses the programmed address for processing message during normal operation instead using of the default address assigned to the slave device during production.

Figure 2:
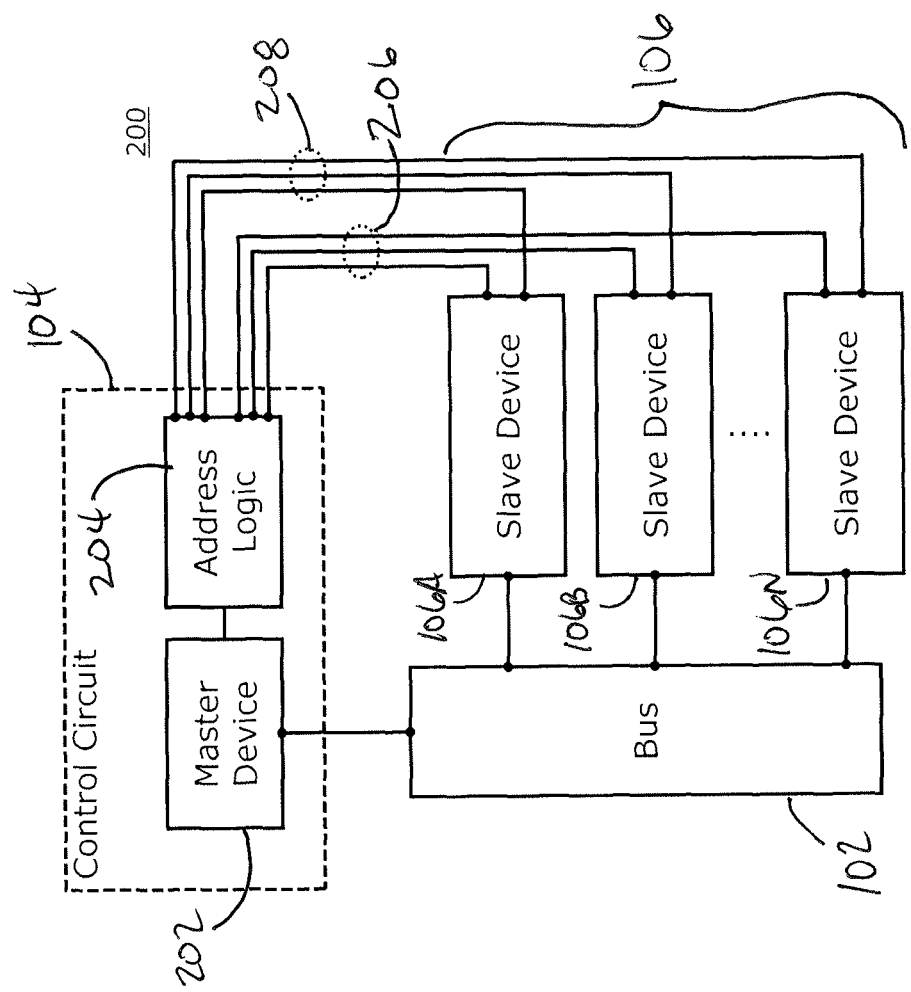
FIG. 2 is a diagram illustrating a system having slave devices with programmable addresses according to some embodiments.

FIG. 2 is a diagram illustrating a system 200 having slave devices 106 with programmable addresses according to some embodiments. The system 200 has a control circuit 104 with, for example, a master device 202 and address logic 204 connected to the master device 202. The master device 202 is connected to the bus 102 and communicated to the slave device 106 though the bus 102 using a bus compatible protocol. The address logic 204, in some embodiments, is a decoder, logic gate chain, or the like, that takes an address or other signal from the master device and converts it into a signal addressing a single slave device 106A . . . 106N. Additionally, in some embodiments, such as a system 200 where each slave device 106 has multiple chip select pins, the address logic 204 provides signals on multiple discrete lines to assert or set all of the chip select pins for a target slave device simultaneously. Thus, a first chip select pin for a slave device 106 may be driven by a signal on first lines 206, and a second chip select pin for the slave device may be driven by a signal on second lines 208 that are separate from the first lines 206. It should be understood that the chip select pins may be asserted using any signals, and that the signals to assert multiple pins on a target slave device may be different. For example, a gate driver control pin and ready indicator pin may operate as the chip select pins, and may be asserted by the address logic 204 by holding the gate driver control pin high and the ready indicator pin low. In such an example, the gate driver control pin is an input pin for the slave device that is driven during normal operation by the control circuit 104 to turn on or off the output of the slave device. The ready indicator pin may be an output pin of the slave device 106, and may be driven by logic within the slave device 106 during normal operation to indicate that the slave device 106 is ready for operation, or is ready to receive commands. In some embodiments, the chip select pins are a combination of input pin and output pin, so that the combination of pins are not unintentionally driven at the same time to indicate that the pins are being used as chip select pins.

While the chip select pins of a target slave device 106 are being driven, the master device 202 sends a command over the bus to the target slave device 106 to set the active address or group address. In some embodiments, the chip select pins for the target slave device may be maintained as asserted while multiple commands to set the active and group addresses are issued to the target slave device. Additionally, after setting each address, the target slave device may confirm that the active or group address was set correctly.

Figure 3A:
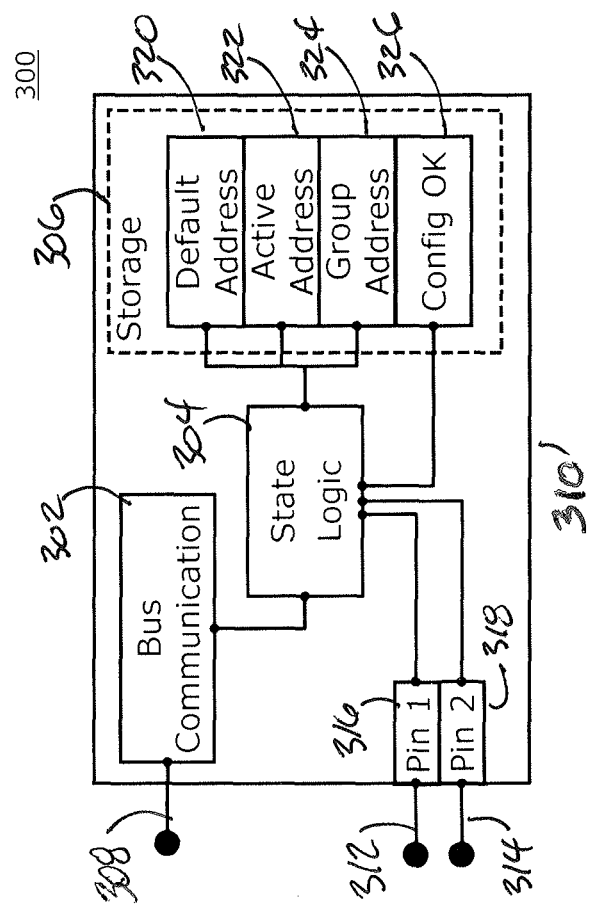
FIG. 3A is a diagram illustrating a device having circuitry for programmable addressing according to some embodiments.

FIG. 3A is a diagram illustrating a device 300 having circuitry for programmable addressing according to some embodiments. In this embodiment, the device 300 may be a slave device that is configured to receive a command to set an address, and to respond to messages directed to the programmed address. In some embodiments, the device 300 includes state logic 304 that controls the logical operations of the device, such as determining whether incoming messages are addressed to the device, handling received commands, and the like. In some embodiments, the state logic 304 may be a logical state machine that is formed from discrete logical components, formed in an integrated circuit such as an application specific circuit, a programmable logic array or gate array, implemented in software executed on a processor, microcontroller, or other computing device, or the like. In some embodiments, the state logic 304 also handles or processes incoming commands and causes the device 300 to respond to or act on the commands.

The state logic 304 is connected to a bus communication circuit 302 that handles incoming and outgoing signals on the bus through one or more bus terminals 308. The bus communication circuit 302 may receive data from the state logic 304 for transmission on the bus, and may handle conversion for signaling in a bus compatible protocol. Similarly, the bus communication circuit 302 receives messages from the bus and sends the data from the message to the state logic 304 for processing or handling. The state logic 304 may process the commands and respond over the bus using the bus communication circuit 302, or may provide an output, signal, response, or the like through, for example, an output such as a output port, pin, display or the like. In some embodiments, for example, where the bus is an I2C bus, the bus terminals 308 include a ground line, an SDA line, an SCL line and a Vcc line, with the bus communication circuit 302 sending and receiving data over the bus using the SDA and SCL lines. In other embodiments where other bus types or protocols are used, the number and type of bus terminals 308 will reflect the requirements of the relevant bus protocol.

The device 300 further includes storage 306 for storing data related to the device addresses. In some embodiments, the storage includes a default address register 320, an active address register 322, and a group address register 324 for devices 300 configured to use a group address. In some embodiments, the storage 306 may further include a configuration check bit storage or register 326. The configuration check register 326 may be used to store a configuration check value or bit indicating that the active address has been configured properly. The registers 320, 322, 324 and 326 may, in some embodiments, be non-volatile memory or another computer readable medium so that an address stored in a respective register 320, 322, 324 is maintained when the storage 306 is powered off. In some embodiments, the default address is stored in the default address register 320 during a manufacturing, production, initialization, or testing phase by a manufacturer. The active address register 322 and group address register 324 are, in some embodiments, writable memory that where the state logic 304 may write a received address to the relevant register. Additionally, the active address or group address may be written to the relevant register by, for example, a system producer or user during system production. In other embodiments, the active address or group address may be written to the relevant register by a manufacturer, distributor or the like for customization before being provided to a system producer or user.

The device 300 further includes one or more pin terminals 312 and 314 that provide connectivity for one or more pins 316 and 318 separate from the bus or bus terminal 308. The pins 316 and 318 are, in some embodiments, chip select pins that also provide additional functionality. During startup or another programming mode, the pins 316 and 318 act as chip select pins, and when the pins 316 and 318 are asserted, the state logic 304 detects the state of the pins 316 and 318, and if the pins 316 and 318 are asserted in a pattern for address programming, the state logic 304 listens for messages on the bus that are addressed to the device 300. When the bus communication circuit 302 receives a message over the bus, it is passed to the state logic 304, which compares the target address from the message to the default address. If the address in the message matches the default address stored in the default address register 320, the state logic 304 then checks the command in the message, and if the command is to set or program the active address, the state logic 304 stores the address from the message in the active address register 322 as the active address. In some embodiments, the state logic 304 may also confirm that the active address was properly saved to the active address register 322. In some embodiments, the device 300 may respond to the address set message with a confirmation message, bit, or response sent over the bus. Additionally, in some embodiments, the state logic 304 may compare the incoming address for the active address to the default address to verify that the active address is not being set to the same address as the default address, which would cause a conflict with other devices still using the default address. If the incoming address is different from the default address, the state logic 304 may save the incoming address in the active address register as the active address, and set the configuration check value to indicate that the configuration of the active address was completed successfully. The configuration check value may be verified by, for example, a master device, control circuit, programming device, or the like, by sending a read command to the device 300 to return the value of the configuration check register 326.

In an example where the device 300 is a voltage driver configured to use an I2C bus, the registers 320, 322, 324 and 326 may have labels identifying the particular register that may be used as an identifier in a message or command sent over the bus to the device 300. The default address may be a default I2C address that may be overwritten or overridden by a user. Overriding the default address with an active address may be mandatory in implementations where there are multiple slaves with the same default address. The device 300 has a default address at start-up that is hard coded in the default address register 320, which may be labelled I2CHWADD, and which may be hidden from the user. For initial access to the active address register 322, which may be labelled I2CADD, the user uses the default address of the device 300 to address messages to the device and uses the first and second pins 316 and 318 as chip select pins. The first pin 316 may be a gate driver control pin labelled PWM IN, and the second pin 318 may be a ready indicator pin labelled RDYC. PWM IN may be used functionally during normal operation to switch the output of the device ON and OFF when PWM IN is not being used as a chip select pin. RDYC is used in normal operation to indicate when the chip is ready. RDYC is normally pulled down internally and may be pulled down externally when used as a chip select.

To assert the pins 316 and 318, PWM IN is pulled high and the RDYC is pulled low by an external device such as a control circuit or the like to select the target device. At this point, the address of the slave device is the default address in the I2CHWADD register. The user configures the I2CADD register by sending an address set command over the bus identifying the selected slave device by the default address. The address set command may have a command such as a write bit set in the message, an identifier of the target memory being written, such as the I2CADD label of the active address register 322, and a value to be stored as the active address. The state logic 304 performs an internal check to ensure that the new active address stored in I2CADD is not equal to the original default address stored in I2CHWADD.

After the I2CADD register has been written, the state logic 304 sets the configuration check value by setting the configuration check register, which may be labeled I2CCFGOK, to 1 to indicate the completion of the configuration and to lock the access to the I2CADD register to prevent accidental changes. The state logic 304 may also send an acknowledgement message, or respond with a confirmation bit on the bus when the I2ADD register has been written correctly. If the active and default addresses are equal, the I2CCFGOK value will not be set and no acknowledgement will be sent.

In some embodiments, the configuration check value can be unset by the state logic 304 or by the user sending a message to the device 300 at any time to revert to the default address or for re-programming the active address. In other embodiments, for example, where the active address is set by a manufacturer, the configuration check value may not be accessible to a user to prevent accidental resetting of the active address.

While the foregoing example is described in terms of an I2C bus interface, other bus interfaces that require an address may be used without deviating from the principles described herein.

Figure 3B:
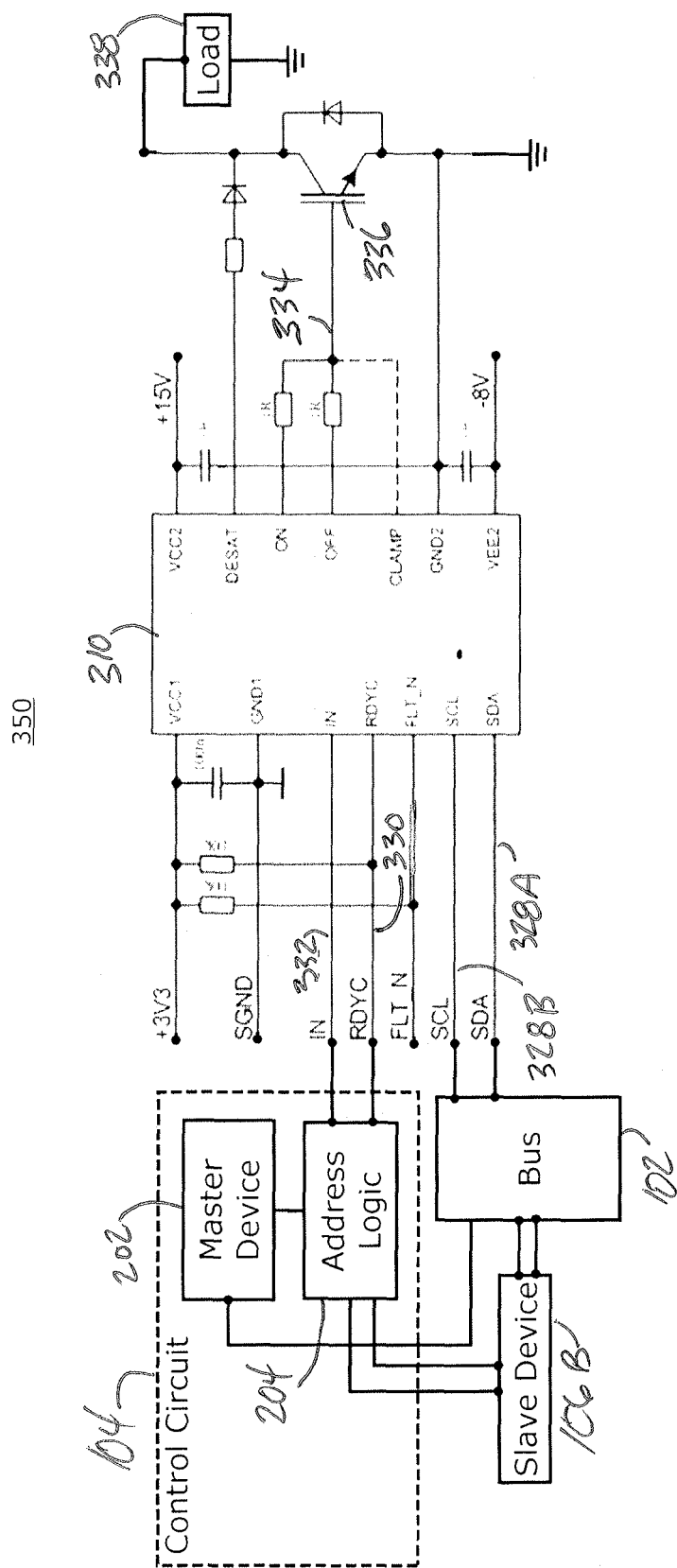
FIG. 3B is a diagram illustrating a system with a programmable addressable slave gate driver according to some embodiments.

FIG. 3B is a diagram illustrating a system 350 with a programmable addressable slave gate driver 310 according to some embodiments. The system 350 has a control circuit 104 including address logic 204 and a master device 202 connected to a bus 102. A gate driver 310 that is a slave device with circuitry for programmable addressing is connected to the bus 102. In some embodiments, the gate driver 310 is connected by an output connection 334 to a control port of a transistor 336 that is controlled or driven by the gate driver 310. A load 338 may be connected to a conduction path of the transistor 336. The system 350 may have one or more second slave devices 106B connected to the bus, and the control circuit 104 may control the gate driver 310 and the second slave device 106B through the bus 102. Additionally, the second slave device 106B and the gate driver may initially have a default address that is the same, and the control circuit may assign or set active or groups addresses in one or both of the second slave device 106B and the gate driver 310.

The gate driver 310 may, in some embodiments, be used to control an electrical signal passing through the transistor 336 to the load 338. For example, in some embodiments, the load 338 is an electric motor, light emitting diode (LED), display, transmitter, or other electric circuit or device. The transistor 336 controls a power signal to the load, and in some embodiments, is capable of handling a higher voltage or current than by the gate driver 310. In some embodiments, the transistor 336 is an npn bipolar junction transistor (BJT), but may one or more metal-oxide field effect transistors (MOSFETs), fin field effect transistors (finFETs), junction field effect transistors (JFETs), insulated gate bipolar transistors (IGBTs), or other electrically controllable switching devices.

The gate driver 310 is connected to the bus by data lines 328A and 328B, and is connected to the control circuit by one or more chip select lines 330 and 332. In embodiments where the bus implements the I2C protocol, the data lines 328A and 328B may be connected to SDA and SCL ports or pins of the gate driver, and may be used to send data to the gate driver 310 to assign an address to the gate driver 310, or to control operation of the gate driver 310.

For example, the gate driver may be a pulse width modulation driver that can be used to control a power transistor for an electric motor. The gate driver 310 may receive addressing assignment information over the data lines 328A and 328B at startup and normal communication message or commands after the addressing is assigned. The chip lines 330 and 332 may be used to indicate to the gate driver 310 that the control circuit is setting an active address or group address for the gate driver 310. After the address is set and verified, the pins to which the chip select lines 330 and 332 are connected are used for additional functionality.

In an embodiment, the gate driver 310 may also receive signals from the control circuit 104 indicating a frequency or duty cycle for a pulse signal to the transistor 336. The gate driver 310 may then process the incoming messages, and provide a signal on the output connection 334 to the control port of the transistor 336. In another embodiment, chip select pins may receive a signal over the chip select lines 330 and 332 that indicates to the gate driver 310 when to turn on or off the transistor 336. The parameters for controlling or operating the transistor 336 may be set by a device parameter message over the bus to gate driver 310. The device parameter message may include information or parameters that describe the manner in which the gate driver 310 should operate the transistor 336, but may not control when the gate driver 310 operates the transistor 336. For example, a gate driver 310 may receive a device parameter message over the bus 102 that instructs the gate driver to control the transistor 336 to control how the transistor gate is driven, for example by describing the rate of change of the voltage across the transistor (dV/dt) or the rate or rate of change of the current flowing through the transistor (di/dt). The control circuit 104 may then provide a signal on one or more of the chip select lines 330 and 332 that causes the gate driver 310 to drive, control or turn on the transistor 336 and operate the transistor 336 according to the parameters in the device parameter message.

In an embodiment where the transistor is a BJT, the signal from the gate driver 310 send over the output connection 334 controls a base current of the transistor 336, which, in turn, controls the current flowing to the load 338. Varying the frequency or duty cycle of the signal through the transistor 336 to the load permits control of, for example, the speed or power of the load 338.

Figure 4:
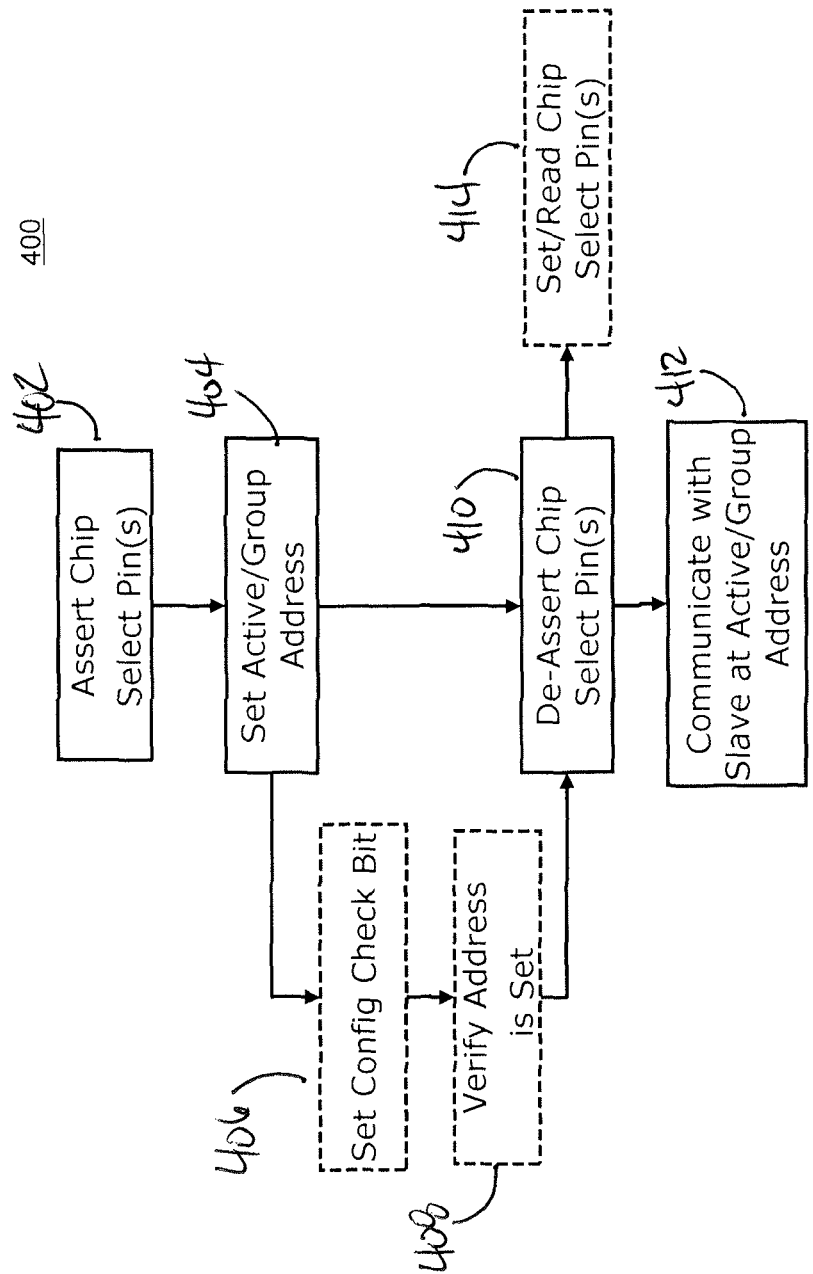
FIG. 4 is a flow diagram illustrating a method for programming an address on a slave device according to some embodiments.

FIG. 4 is a flow diagram illustrating a method 400 for programming an address on a slave device according to some embodiments. The method may be performed using a programming circuit such as a device programmer, a system in which the slave device is disposed, or any other system for programming a slave device. In block 402, the programming circuit asserts the chip select pins to the target slave device by sending signals to the chip select pins on lines separate from the bus. In block 404, the programming circuit sets an active or group address by sending a message on the bus to the target slave device while the chip select pins are asserted. In some embodiments, the message includes the default address of the target slave device, a command to set the active address, and a data value representing the active address. The state logic then saves the active address. In some embodiments, the programming circuit may then, in block 406, set the configuration check bit or register by sending a second message to the target slave device. The second message includes the default address of the target slave device, which is still used for the second message since the configuration check value is not yet set. The second message also includes a command to set the configuration check bit, and in some embodiments, also includes the value to which the configuration check is set. In other embodiments, the device itself may set the configuration check bit. Additionally, in some embodiments, the programming circuit verifies, in block 408 that the active address is properly set. The programming circuit may verify the active address by checking for a confirmation bit or message sent in response to setting the active or group address, or in response to setting the confirmation check bit. In other embodiments, the programming circuit may read the active address value stored in the active address register, or send a read or write command to the target slave device using the active address, and check for a valid response. In block 410, the programming circuit de-asserts the chip select pins by stopping the chip select signals to the chip select pins. The target slave device may then be used for normal operation, and in block 412, a user or system may communicate with the target slave device at the active or group address. Additionally, in some embodiments, the programming circuit, in normal operation, may set or read the chip select pins of the target in block 414. During normal operation, the chip select pins have additional functionality beyond the chip select function, avoiding a need for dedicated address pins on the slave device.

Figure 5:
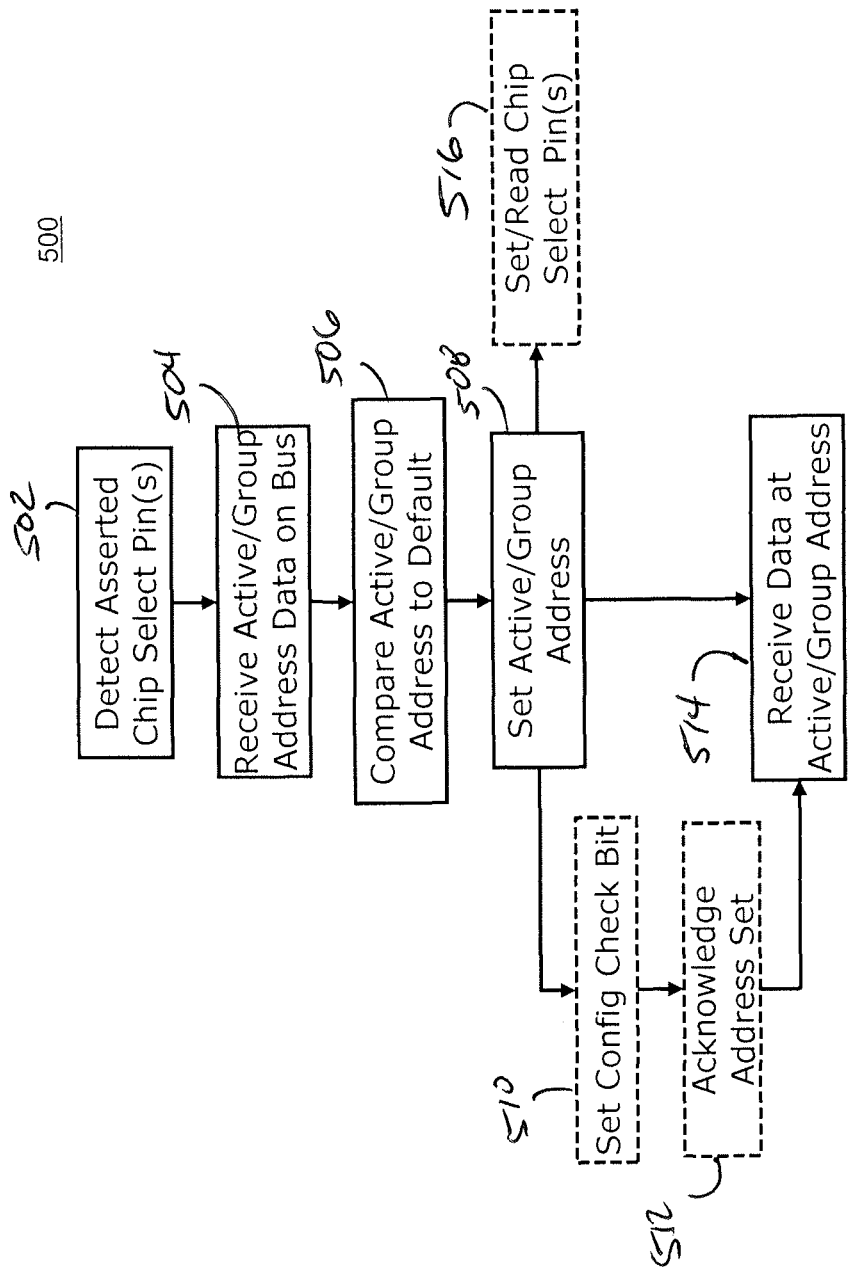
FIG. 5 is a flow diagram illustrating a method for a slave device to set a programmable address according to some embodiments.

FIG. 5 is a flow diagram illustrating a method for slave device to set a programmable address according to some embodiments. In block 502, the slave device detects that the chip select pins are asserted. In block 504, the slave device receives active or group address data on the bus. In some embodiments, the active or group address data is received in a first message that identifies the default address, a command to set the active or group address, and a value indicating the active or group address to be saved into the relevant register. The slave device determines that a received message is intended for the slave device by determining that the chip select pins are set, and determining that the destination address in the message is the same as the default address. Additionally, in some embodiments, the slave device may set the active address by checking the value of the configuration check bit or register. If the configuration check bit is set, the slave device may ignore the address set message and avoid sending any confirmation that the command was executed. In block 506, the slave device compares the active or group address from the first message to the default address. If the active or group address and the default address are different, then the slave device sets the active or group address to the address in the first message in block 508. Otherwise, the slave device stops processing the command in the first message and avoids setting the active or group address and sending a confirmation message. While setting the active or group address is described in this embodiments as being performed in response to the active or group address in the first message being different than the default address, in other embodiments, the active or group address from the first message may be saved into the relevant register and then compared against the default address, and overwritten or ignored if the addresses match.

In some embodiments, if the active or group address is successfully set, the configuration check register or bit is set in block 510. In some embodiments, the slave device sets the configuration check value in response to the slave device setting the active or group address, or in response to receiving a message on the bus to set the configuration check value. Additionally, in some embodiments, the slave device may acknowledge the active or group address being set in block 512 by, for example, pulling down the bus lines to signal an acknowledgement that the set address command was executed, by sending a message on the bus, or by another acknowledgement technique. After the active or group address is set and verified, the slave device resumes normal operation. In block 514, the slave device receives, on the bus and during normal operation, data or commands in a message addressed using the set active or group address. Additionally, in some embodiments, the slave device may set or read the chip select pins, during normal operation, as part of the additional functionality.

Figure 6:
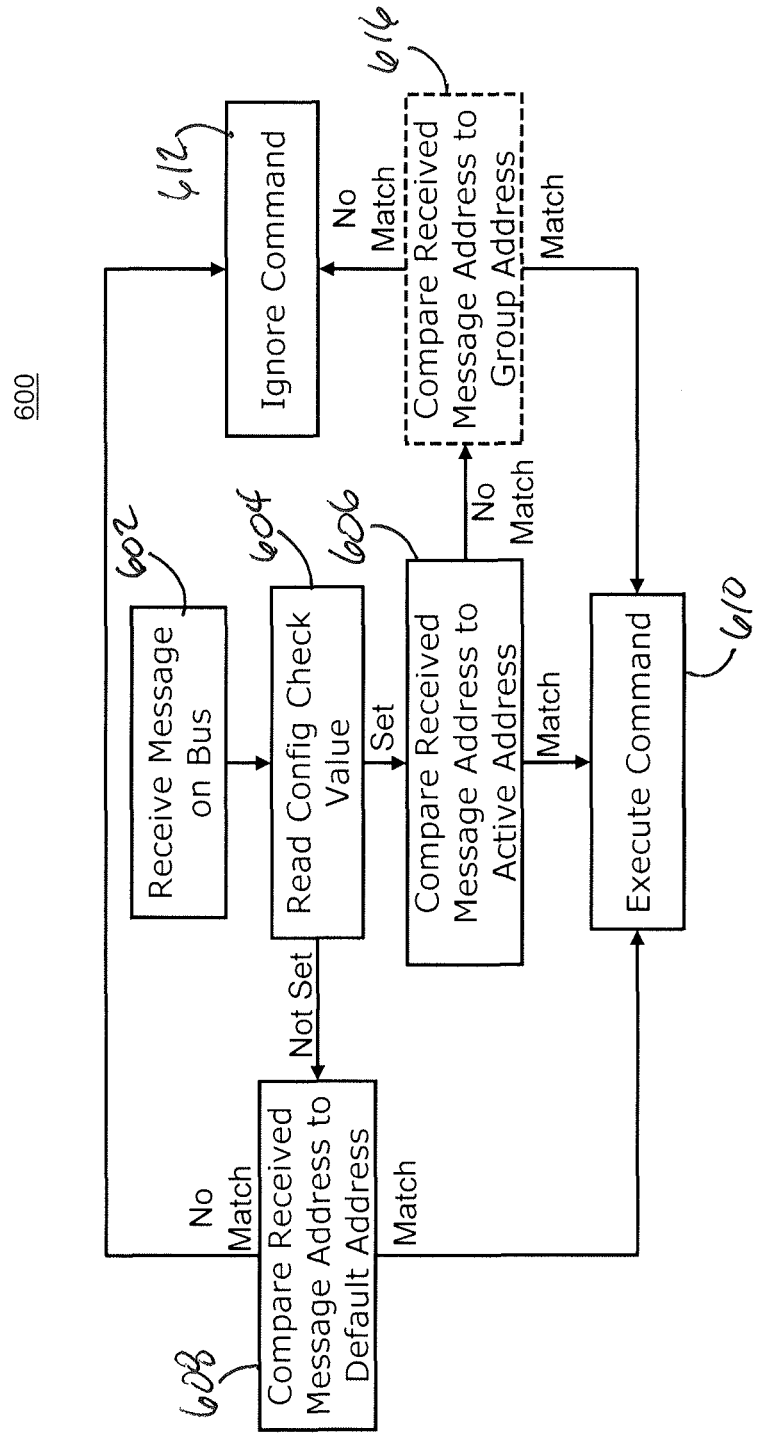
FIG. 6 is a diagram illustrating a method for processing a message using a programmed address according to some embodiments.

FIG. 6 is a diagram illustrating a method 600 for processing a message using a programmed address according to some embodiments. A slave device may use the method to process messages or commands using the active or group address stored on the slave device after the active address or group address is set as described above. In block 602, the slave device receives a message on the bus. The message has at least a target address indicating the intended bus device and also has a data payload that may include a command or data value. The slave device reads the configuration check value in block 604 to determine whether the slave device should use a programmed active address or the preset default address. If the configuration check value is not set, then in block 608, the slave device compares the target address from the message to the default address. If they match, then the message was intended for the slave device, and the slave device executes the command in block 610, otherwise the command is ignored in block 612. If the configuration check value is set, then the slave device uses the active or group address for handling the incoming message. In block 606, the slave device compares the received target address from the message to the value of the active address stored in the active address register. If the addresses match, then the slave device executes the command in the message in block 610. If the target address does not match the active address, the slave device checks attempts to use the group address to handle the message. In block 616, the slave device compares the target address from the message to the value of the group address stored in the group address register. If the target address matches the group address group, then the slave device executes the command from the message in block 610. If the target address does not match the group address, the slave device ignores the command in the message in block 612. Thus, the slave device uses the configuration check value to determine whether to use the default address or a programmable address, and then compares the address of the target slave device from the message to the programmable addresses to determine whether the message is intended for the slave device, and executes or ignores the command in the message accordingly.

An embodiment device includes a bus communication circuit connected to a bus terminal, a first pin terminal, a memory having a first register with a first address stored therein and a second register, and a state logic circuit connected to the memory, the first pin terminal and the bus communication circuit. The state logic circuit has circuitry that detects a chip select signal on the first pin terminal and that receives a first message through the bus communication circuit while the chip select signal is asserted. The state logic circuit further has circuitry that determines that the first message indicates an address set command and saves an address value in the first message as a second address in the second register in response to a target address in the first message matching the first address. The state logic circuit further has circuitry that processes a second message received through the bus communication circuit in response to a target address of the second message matching the second address.

In an embodiment, the state logic circuit further has additional functionality circuitry that performs, during normal operation, at least one of providing a signal to the first pin terminal, or detecting a function signal, other than the chip select signal, at the first pin terminal and executing a function associated with the function signal. In an embodiment, the circuitry that saves the address value in the first message as the second address in the second register saves the address value in the first message as the second address in the second register in response to the state logic circuit determining that the address value is different from the first address. In an embodiment, the state logic circuit further has circuitry that provides an acknowledgement to the bus terminal through the bus communication circuit in response to the state logic circuit successfully saving the address value as the second address in the second register. In an embodiment, the state logic circuitry that processes the second message includes circuitry that processes the second message received through the bus communication circuit in response to the target address of the second message matching the second address and without regard for the first address.

An embodiment method includes asserting, to a chip select pin of a first slave device connected to a bus, a chip select signal, wherein the chip select signal is sent to the chip select pin outside of the bus and setting a first address of the first slave device by sending a first message on the bus to the first slave device while the chip select signal is asserted. The first message includes a default address of the first slave device, a command to set the first address, and a data value representing the first address. The embodiment method further includes sending a second message to the first slave device over the bus after the chip select signal is deasserted, the second message being addressed using the first address. In an embodiment, the first address is an active address, and the active address of the first slave device is different from an active address of one or more second slave devices connected to the bus. In an embodiment, the method further includes setting a second address of the first slave device by sending a third message on the bus to the first slave device while the chip select signal is asserted, the third message including the default address of the first slave device, a command to set the second address, and a data value representing the second address. The second address is a group address, and the group address of the first slave device is different from the active address of the first slave device and from the active address of each of the one or more second slave devices, and the group address of the first slave device is different from the default address of the first slave device and the default address of each of the one or more second slave devices. The group address of the first slave device matches a group address of at least one of the second slave devices. In an embodiment, the method further includes receiving from the first slave device over the bus, in response to the second address being different from the default address of the first slave device and the active address of the first slave device and further in response to the data value being successfully saved by the first slave device as the second address, an acknowledgement that the command to set the second address was completed. In an embodiment, the method further includes receiving from the first slave device over the bus, in response to the first address being different from the default address of the first slave device and further in response to the data value being successfully saved by the first slave device as the first address, an acknowledgement that the command to set the first address was completed.

An embodiment method includes detecting, by a device having a bus terminal and a first pin terminal separate from the bus terminal, that a chip select signal is asserted at the first pin terminal, receiving, by the device, on the bus terminal and while the chip select signal is asserted, a first message, the first message including a target address, a command to set a first address on the device, and a data value representing the first address, and saving the data value as the first address in a first register of the device in response to the target address of the first message matching a default address of the device. The method further includes processing, by the device, a second message received by the device on the bus terminal during normal operation in response to a target address of the second message matching the first address.

In an embodiment, the method further includes performing, during normal operation, at least one of providing a signal to the first pin terminal, or detecting a function signal at the first pin terminal other than the chip select signal and executing a function associated with the function signal. In an embodiment, the saving the data value as the first address in the first register is performed in response to the address value being different from the default address of the device. In an embodiment, the method further includes providing an acknowledgement to the bus terminal in response to successfully saving the data value as the first address in the first register. In an embodiment, the device is a gate driver having an output port connected to a control port of a transistor, and the processing the second message received by the device on the bus terminal during normal operation in response to the target address of the second message matching the first address includes sending a signal through the output port to the transistor and controlling a current through the transistor according to the second message.

An embodiment method includes receiving a first message sent over a bus by a device connected to the bus and having saved thereon a first programmable address that is different from a default address of the device, comparing a first target address in the first message to the default address in response to a configuration check value not being set, and processing the first message in response to the first target address matching the default address and the configuration check value not being set. The method further includes comparing the first target address to the first programmable address in response to the configuration check value being set, and processing the first message in response to the first target address matching the programmable first address and the configuration check value being set. In an embodiment, the method further includes comparing the first target address to a second programmable address saved on the device in response to the first target address not matching the programmable first address and the configuration check value being set, processing the first message in response to the first target address matching the second programmable address and the configuration check value being set, and ignoring the first message in response to the first target address not matching the first programmable address, the first target address not matching the second programmable address, and the configuration check value being set. The second programmable address is a group address that matches a group address of another device connected to the bus. In an embodiment, the method further includes receiving, by the device, and while a chip select signal is asserted at a pin of the device, a second message sent over the bus, the second message including a second target address, a command to set the first programmable address on the device, and a data value representing the programmable first address, and saving the data value as the first programmable address in a first register of the device in response to the second target address matching the default address. In an embodiment, the method further includes providing an acknowledgement over the bus in response to successfully saving the data value as the first programmable address.

An embodiment system includes a bus, a plurality of slave devices connected to the bus, each of the plurality of slave devices having a default address and an input pin separate from the bus. Each of the plurality of slave devices is configured to receive messages over the bus. The embodiment system further includes a control circuit connected to the bus, and separately connected by a line of a plurality of lines separate from the bus to the input pin of each of the plurality of slave devices, the control circuit is configured to assert a signal on the line to a target slave device of the plurality of slave devices, and, while the signal is asserted, send, over the bus, a first message indicating an address set command using the default address of the target slave device. Each of the plurality of slave devices are further configured to save, when the signal is asserted to the respective slave device, a value from the first message as a first address in response to a target address of the first message matching the default address of the respective one of the plurality of slave devices.

In an embodiment, each of the plurality of slave devices is further configured to process a second message received from the control circuit over the bus in response to a target address of the second message matching the first address. In an embodiment, the plurality of slave devices includes a gate driver having an output connected to a control port of a transistor, the gate driver configured to control a current through the transistor according to the second message. In an embodiment, the first address is an active address, and the active address of each of the plurality of slave devices is different from each other and from the default address of each of the plurality of slave devices. In an embodiment, the control circuit is further configured to, while the signal is asserted, send, over the bus, a third message indicating an address set command using the default address of the target slave device. Each of the plurality of slave devices are further configured to save, when the signal is asserted to the respective slave device, a value from the third message as a second address in response to a target address of the third message matching the default address of the respective one of the plurality of slave devices. The second address is a group address, the group address of each of the plurality of slave devices is different from the active address of each of the plurality of slave devices and from the default address of each of the plurality of slave devices, and the group address of at least one of the plurality of slave devices matches the group address of at least one other slave device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device, comprising:
   a bus communication circuit connected to a bus terminal;
   a first pin terminal;
   a memory having a first register with a first address stored therein and a second register;
   a state logic circuit connected to the memory, the first pin terminal and the bus communication circuit, wherein the state logic circuit has circuitry that detects a chip select signal on the first pin terminal and that receives a first message through the bus communication circuit while the chip select signal is asserted, wherein the state logic circuit further has circuitry that determines that the first message indicates an address set command and saves an address value in the first message as a second address in the second register in response to a target address in the first message matching the first address, and wherein the state logic circuit further has circuitry that processes a second message received through the bus communication circuit in response to a target address of the second message matching the second address.

2. The device of claim 1, wherein the state logic circuit further has additional functionality circuitry that performs, during normal operation, at least one of providing a signal to the first pin terminal, or detecting a function signal, other than the chip select signal, at the first pin terminal and executing a function associated with the function signal.

3. The device of claim 1, wherein the circuitry that saves the address value in the first message as the second address in the second register saves the address value in the first message as the second address in the second register in response to the state logic circuit determining that the address value is different from the first address.

4. The device of claim 3, wherein the state logic circuit further has circuitry that provides an acknowledgement to the bus terminal through the bus communication circuit in response to the state logic circuit successfully saving the address value as the second address in the second register.

5. The device of claim 1, wherein the state logic circuitry that processes the second message includes circuitry that processes the second message received through the bus communication circuit in response to the target address of the second message matching the second address and without regard for the first address.

6. A method, comprising:
   asserting, to a chip select pin of a first slave device connected to a bus, a chip select signal, wherein the chip select signal is sent to the chip select pin outside of the bus;
   setting a first address of the first slave device by sending a first message on the bus to the first slave device while the chip select signal is asserted, the first message including a default address of the first slave device, a command to set the first address, and a data value representing the first address; and
   sending a second message to the first slave device over the bus after the chip select signal is deasserted, the second message being addressed using the first address.

7. The method of claim 6, wherein the first address is an active address, and wherein the active address of the first slave device is different from an active address of one or more second slave devices connected to the bus.

8. The method of claim 7, further comprising
   setting a second address of the first slave device by sending a third message on the bus to the first slave device while the chip select signal is asserted, the third message including the default address of the first slave device, a command to set the second address, and a data value representing the second address;
   wherein the second address is a group address, and wherein the group address of the first slave device is different from the active address of the first slave device and from the active address of each of the one or more second slave devices, wherein the group address of the first slave device is different from the default address of the first slave device and the default address of each of the one or more second slave devices; and wherein the group address of the first slave device matches a group address of at least one of the second slave devices.

9. The method of claim 8, further comprising receiving from the first slave device over the bus, in response to the second address being different from the default address of the first slave device and the active address of the first slave device and further in response to the data value being successfully saved by the first slave device as the second address, an acknowledgement that the command to set the second address was completed.

10. The method of claim 6, further comprising receiving from the first slave device over the bus, in response to the first address being different from the default address of the first slave device and further in response to the data value being successfully saved by the first slave device as the first address, an acknowledgement that the command to set the first address was completed.

11. A method, comprising:
   detecting, by a device having a bus terminal and a first pin terminal separate from the bus terminal, that a chip select signal is asserted at the first pin terminal;
   receiving, by the device, on the bus terminal and while the chip select signal is asserted, a first message, the first message including a target address, a command to set a first address on the device, and a data value representing the first address;
   saving the data value as the first address in a first register of the device in response to the target address of the first message matching a default address of the device; and
   processing, by the device, a second message received by the device on the bus terminal during normal operation in response to a target address of the second message matching the first address.

12. The method of claim 11, further comprising performing, during normal operation, at least one of providing a signal to the first pin terminal, or detecting a function signal at the first pin terminal other than the chip select signal and executing a function associated with the function signal.

13. The method of claim 11, wherein the saving the data value as the first address in the first register is performed in response to the address value being different from the default address of the device.

14. The method of claim 13, further comprising providing an acknowledgement to the bus terminal in response to successfully saving the data value as the first address in the first register.

15. The method of claim 11, wherein the device is a gate driver having an output port connected to a control port of a transistor; and
   wherein the processing the second message received by the device on the bus terminal during normal operation in response to the target address of the second message matching the first address comprises sending a signal through the output port to the transistor and controlling a current through the transistor according to the second message.

16. A method, comprising:
   receiving a first message sent over a bus by a device connected to the bus and having saved thereon a first programmable address that is different from a default address of the device;
   comparing a first target address in the first message to the default address in response to a configuration check value not being set;
   processing the first message in response to the first target address matching the default address and the configuration check value not being set;
   comparing the first target address to the first programmable address in response to the configuration check value being set; and
   processing the first message in response to the first target address matching the programmable first address and the configuration check value being set.

17. The method of claim 16, further comprising:
   comparing the first target address to a second programmable address saved on the device in response to the first target address not matching the programmable first address and the configuration check value being set;
   processing the first message in response to the first target address matching the second programmable address and the configuration check value being set; and
   ignoring the first message in response to the first target address not matching the first programmable address, the first target address not matching the second programmable address, and the configuration check value being set;
   wherein the second programmable address is a group address that matches a group address of another device connected to the bus.

18. The method of claim 16, further comprising:
   receiving, by the device, and while a chip select signal is asserted at a pin of the device, a second message sent over the bus, the second message including a second target address, a command to set the first programmable address on the device, and a data value representing the programmable first address; and
   saving the data value as the first programmable address in a first register of the device in response to the second target address matching the default address.

19. The method of claim 18, further comprising providing an acknowledgement over the bus in response to successfully saving the data value as the first programmable address.

20. A system, comprising:
   a bus;
   a plurality of slave devices connected to the bus, each of the plurality of slave devices having a default address and an input pin separate from the bus, wherein each of the plurality of slave devices is configured to receive messages over the bus; and
   a control circuit connected to the bus, and separately connected by a line of a plurality of lines separate from the bus to the input pin of each of the plurality of slave devices, wherein the control circuit is configured to assert a signal on the line to a target slave device of the plurality of slave devices, and, while the signal is asserted, send, over the bus, a first message indicating an address set command using the default address of the target slave device;
   wherein each of the plurality of slave devices are further configured to save, when the signal is asserted to the respective slave device, a value from the first message as a first address in response to a target address of the first message matching the default address of the respective one of the plurality of slave devices.

21. The system of claim 20, wherein each of the plurality of slave devices is further configured to process a second message received from the control circuit over the bus in response to a target address of the second message matching the first address.

22. The system of claim 21, wherein the plurality of slave devices includes a gate driver having an output connected to a control port of a transistor, the gate driver configured to control a current through the transistor according to the second message.

23. The system of claim 20, wherein the first address is an active address, and wherein the active address of each of the plurality of slave devices is different from each other and from the default address of each of the plurality of slave devices.

24. The system of claim 23, wherein the control circuit is further configured to, while the signal is asserted, send, over the bus, a third message indicating an address set command using the default address of the target slave device;
- wherein each of the plurality of slave devices are further configured to save, when the signal is asserted to the respective slave device, a value from the third message as a second address in response to a target address of the third message matching the default address of the respective one of the plurality of slave devices; and
- wherein the second address is a group address, and wherein the group address of each of the plurality of slave devices is different from the active address of each of the plurality of slave devices and from the default address of each of the plurality of slave devices, and wherein the group address of at least one of the plurality of slave devices matches the group address of at least one other slave device.

\* \* \* \* \*